(12) United States Patent
Guha et al.

(10) Patent No.: US 8,301,616 B2
(45) Date of Patent: Oct. 30, 2012

(54) SEARCH EQUALIZER

(75) Inventors: Sudipta Guha, Cupertino, CA (US); Ralph Rabbat, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 157 days.

(21) Appl. No.: 11/486,818

(22) Filed: Jul. 14, 2006

(65) Prior Publication Data

US 2008/0016034 A1   Jan. 17, 2008

(51) Int. Cl.
G06F 7/00 (2006.01)
(52) U.S. Cl. ......... 707/708; 707/741; 707/749; 707/771
(58) Field of Classification Search .................. None
See application file for complete search history.

(56) References Cited

U.S. PATENT DOCUMENTS

| | | | |
|---|---|---|---|
| 5,278,980 A * | 1/1994 | Pedersen et al. | 707/4 |
| 5,845,278 A * | 12/1998 | Kirsch et al. | 707/3 |
| 6,169,986 B1 | 1/2001 | Bowman et al. | |
| 6,385,602 B1 | 5/2002 | Tso et al. | |
| 6,408,270 B1 | 6/2002 | Garber | |
| 6,564,213 B1 | 5/2003 | Ortega et al. | |
| 6,587,850 B2 | 7/2003 | Zhai | |
| 6,640,218 B1 | 10/2003 | Golding et al. | |
| 6,697,793 B2 | 2/2004 | McGreevy | |
| 6,947,930 B2 | 9/2005 | Anick et al. | |
| 6,978,264 B2 | 12/2005 | Chandrasekar et al. | |
| 6,985,898 B1 | 1/2006 | Ripley et al. | |
| 7,039,635 B1 | 5/2006 | Morgan et al. | |
| 7,181,438 B1 * | 2/2007 | Szabo | 707/2 |
| 7,249,126 B1 * | 7/2007 | Ginsburg et al. | 707/3 |
| 7,487,144 B2 | 2/2009 | Shakib et al. | |
| 7,499,940 B1 * | 3/2009 | Gibbs | 707/102 |
| 2002/0152204 A1 | 10/2002 | Ortega et al. | |
| 2003/0018621 A1 | 1/2003 | Stiner et al. | |
| 2003/0101172 A1 | 5/2003 | De La Huerga | |
| 2003/0135490 A1 | 7/2003 | Barrett et al. | |

(Continued)

FOREIGN PATENT DOCUMENTS

JP 08-255159 10/1996

(Continued)

OTHER PUBLICATIONS

"Communication Pursuant to Article 94(3) EPC" received in European case 06801807.6 dated Jun. 6, 2008, 3 pages.

(Continued)

*Primary Examiner* — Debbie Le
*Assistant Examiner* — Anh Tai Tran
(74) *Attorney, Agent, or Firm* — Hickman Palermo Truong Becker Bingham Wong LLP

(57) ABSTRACT

A method for processing query data is described that includes receiving a query portion from a client over a network. For each of multiple search contexts, a relevance score is determined, based on the query portion. Each search context corresponds to a different set of information against which queries can be executed. Indication of the relevance scores is provided to the client over the network. Determining the relevance score and providing indication are performed prior to an input indicating a complete query or in response thereto. The method may also include associating shortcuts with search contexts, selecting a set of shortcuts based, at least in part, on the relevance scores for the search contexts and the association between the shortcuts and search contexts, and sending the set of shortcuts to the client. The shortcuts include links for accessing a content location associated with the shortcut.

38 Claims, 15 Drawing Sheets

Exemplary Screen Shot 81

U.S. PATENT DOCUMENTS

| | | | |
|---|---|---|---|
| 2003/0135499 A1 | 7/2003 | Schirmer et al. | |
| 2003/0195877 A1* | 10/2003 | Ford et al. | 707/3 |
| 2003/0225755 A1* | 12/2003 | Iwayama et al. | 707/3 |
| 2004/0021691 A1 | 2/2004 | Dostie et al. | |
| 2004/0143564 A1* | 7/2004 | Gross et al. | 707/1 |
| 2004/0153963 A1 | 8/2004 | Simpson et al. | |
| 2004/0267730 A1 | 12/2004 | Dumais et al. | |
| 2005/0222981 A1 | 10/2005 | Lawrence et al. | |
| 2005/0222987 A1* | 10/2005 | Vadon | 707/3 |
| 2005/0283468 A1 | 12/2005 | Kamvar et al. | |
| 2005/0288959 A1 | 12/2005 | Eraker et al. | |
| 2006/0064411 A1 | 3/2006 | Gross et al. | |
| 2006/0106768 A1 | 5/2006 | van Deursen | |
| 2006/0173822 A1* | 8/2006 | Watson et al. | 707/3 |
| 2006/0190436 A1 | 8/2006 | Richardson et al. | |
| 2006/0206454 A1 | 9/2006 | Forstall et al. | |
| 2006/0287980 A1 | 12/2006 | Liu et al. | |
| 2007/0244863 A1* | 10/2007 | Adams et al. | 707/3 |
| 2008/0021721 A1 | 1/2008 | Jones et al. | |
| 2008/0077558 A1* | 3/2008 | Lawrence et al. | 707/3 |
| 2010/0161661 A1 | 6/2010 | Hood | |

FOREIGN PATENT DOCUMENTS

| | | |
|---|---|---|
| JP | 09-259145 | 10/1997 |
| JP | 10-222502 | 8/1998 |
| JP | 08-292944 | 11/1998 |
| JP | 2005-173984 | 6/2005 |
| JP | 2010222502 A | 10/2010 |
| WO | WO 2004/073286 | 8/2004 |
| WO | WO 2005/098592 | 10/2005 |
| WO | WO 2007/024594 | 3/2007 |
| WO | 2009259145 A | 11/2009 |

OTHER PUBLICATIONS

"Communication pursuant to Article 94(3) EPC" received in Application No. 06 801 807.6-2201 dated Mar. 26, 2009 (7 pages).

Current Claims of 06 801 807.6-2201 dated Mar 9, 2008 (3 pages).

Clarke, C. et al., "Relevance ranking for one to three term queries" Information Processing and Management 36 (2000) pp. 291-311.

Chinese Office Action dated Jul. 12, 2010 received in Application No. 200680030930.5 (16 pages).

Current Claims of Chinese Office Action (Jul. 2010) 2 pages.

Chinese Office Action received in application No. 200680030930.5 dated Nov. 1, 2010 (7 pages).

Current Claims of Chinese application No. 200680030930.5, Dec. 2010 (2 pages).

Japanese Office Action received in application No. 528004/2008 dated Dec. 13, 2010 (3 pages).

Current Claims of Japanese application No. 528004/2008, Jan. 2011 (4 pages).

The Patent of the People's Republic of China, Chinese Office Action received in International application No. 200680030930.5, Applicant: Yahoo! Inc., dated Jun. 2, 2011, 14 pages.

Chinese Current Claims in International application No. 200680030930.5 dated Jun. 2011, 3 pages, Applicant: Yahoo! Inc.

Japanese Office Action received in International application No. 528004/2008 dated Jan. 4, 2012 (4 pages).

Japanese Current Claims in International application No. 528004/2008 dated Jan. 2012 (5 pages).

Matlis, J., I Mark Trend, No. 6, Web Application Development Market, IT Market Trend, Computerworld Get Technology Right, Japan, IDG Japan, Aug. 23, 2005, vol. 2, includes partial translation (6 pages).

Japanese Office Action received in International application No. 528004/2008 dated Sep. 5, 2011, 2 pages.

Japanese Current Claims in International application No. 528004/2008 dated Sep. 2011 5 pages.

* cited by examiner

Exemplary Screen Shot 81

Example Screen Shot 83

Example Screenshot 85

SEARCH EQUALIZER

TECHNOLOGY

The present invention relates generally to search engines. More specifically, embodiments of the present invention relate to interactive user interfaces functional with a search engines for obtaining more relevant search results.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Search engines are common and useful tools for searching the Internet for any type of information that is web accessible. They respond to user queries by generating a list of links to documents deemed relevant to the query. Search engines are also used in proprietary websites to search for information specifically pertaining to the proprietary websites.

However, search engines perform all their work for a user only after the user has entered a query into a query field and issued the query by clicking "Search," "Enter," "Go" or another more or less familiar initiating input. This traditional approach is intuitive because the only time a search engine "knows" for certain what a user desires is when the user decides that the query is correct and complete by formally issuing the query. Thus, search engines do not provide help to the user while the user is formulating a query. Accordingly, search engines must "wait" to provide the search results until the user has determined that the query is complete, at which time the user explicitly issues the query to a search engine. As a logical extension, any additional information relating to the query and search results is provided after the user issues the query.

Furthermore, the manner in which the user issues subsequent queries is relatively time consuming. If the user is dissatisfied with the search results of a particular query, the user must reformulate a subsequent query and then issue that query. Again, the search engine does not provide any assistance or search results until after the subsequent query is issued.

Moreover, a number of modern search engines and/or web sites that provide access thereto are arranged with or make available to users thereof multiple verticals, which organize the presentation and availability of information and sources thereof into groups that conform to some logical arrangement. The Yahoo™ web site, available at the Uniform Resource Locator (URL) http://www.yahoo.com for instance, makes available to its users at least seven verticals. Users may access the Web (e.g., the World Wide Web, aka "WWW") directly for running searches thereon using Yahoo's "Web" vertical. The Yahoo web site also makes available verticals labeled "Images," "Video," "Audio," "Directory," "Local," "News," and "Shopping." These verticals serve as intuitively comprehensible categories with which users can more closely focus in seeking information. Similarly, the Google™ web site, available at the URL http://www.google.com, provides another familiar example. The Google web has verticals named "Web," "Images," "Groups," "News," "Froogle™", (a shopping related vertical), "Maps," and "Desktop."

Although verticals available through the Yahoo, Google and similar web pages as well as more specialized web sites or web sites with a more narrow or specialized appeal allow users to focus their information gathering, a significant number of users behave as though they are unaware of these features, unsophisticated about using verticals and/or unsure of which verticals to use. Thus, many users simply avoid seeking information therewith and tend to simply perform a Web based search, e.g., a query directed across the Wed, in its entirety. At least in part, this seems to be a result of the familiarity most users have to the earlier developed and very well known Web search.

Searching the entire Web in this manner, users tend to obtain large numbers of "hits" (e.g., query results) relative to searches performed using the verticals to focus and streamline their search. However, while these users tend to obtain a relatively large number of hits using an overall Web search, all of the many results they obtain therefrom may not be fully relevant to their purposes. This places users in a position wherein they must somewhat carefully read through their search results, sometimes over multiple web pages full of hits, many of them lacking in real relevance. This practice can be tedious, time consuming, costly and prone to errors, in the sense of glossing over or skimming past a truly relevant result, which may be obscured, occluded, obfuscated and camouflaged by the plethora of their other search results, many if not most of which may be irrelevant to their true search purposes.

Sometimes this causes users to conduct one or more subsequent queries. In doing so, users may modify their query with changed or additional search terms, Boolean search additions and/or groupings such as quotation mark setoffs, conjunctive and/or disjunctive grouping symbols and the like. However, repeating queries demands time, effort and bandwidth themselves and thus bear associated costs of their own. These costs are intensified by the thoughtfulness users must apply to modify their query terms. And obviously, successive searches all make their own demands on networking and computational resources, consuming time, bandwidth, processing and memory.

One approach to addressing these issues has been for web site hosts to experiment with associating a graphical indication feature to links for one or more to their verticals, which can indicate a frequency of query results obtained that pertain to particular verticals for a given, wholly executed query. However, the indications so provided are provided upon completion of the query's execution static and are thus static. Further, some such indicators seem to ascribe an inference that hits belong in certain verticals from results obtained by searching the entire Web. Their usefulness is limited because of their static nature and/or because their accuracy in predicting relevance of the search results and/or precision in ascribing the results to a truly relevant vertical.

Based on the foregoing, there is a need for search engines to responsively and proactively suggest verticals in which a user's query may be more fruitful in terms of relevance of results and while actively assisting users with their queries as they formulate them and before the user formally issues a full and complete query.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
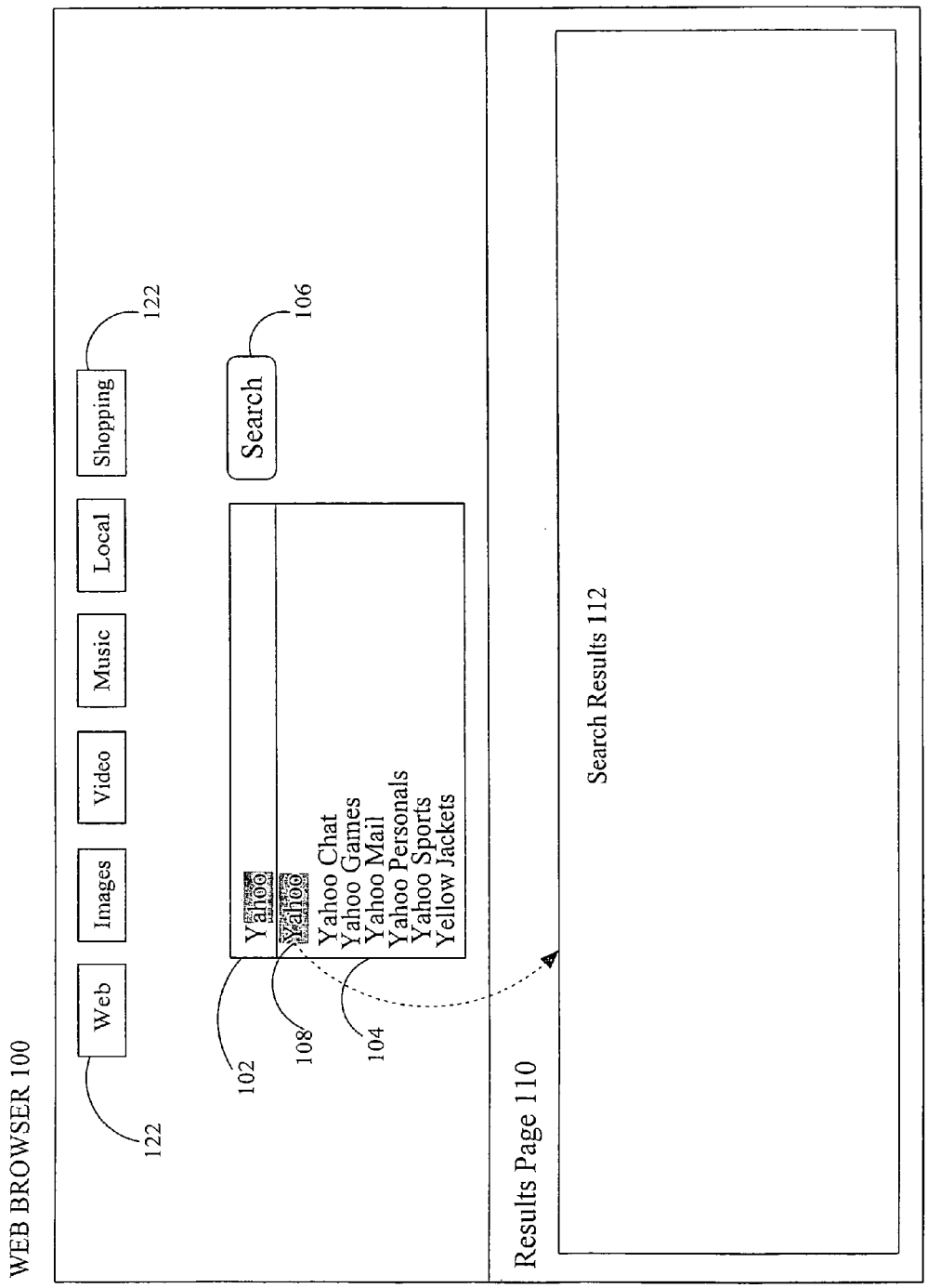
FIG. 1 illustrates a user interface that displays predicted queries based on input entered in a query field, and search results from the most likely predicted query, according to an embodiment of the invention.

An interactive search equalizer is described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An interactive search equalizer is described herein. The interactive search equalizer described herein categorizes user queries into one or more verticals and assists a user in determining which of the verticals provides more fertile ground for obtaining the most relevant possible results for a given query. The search equalizer also provides a choice to the user for navigating through the various verticals. The user can navigate through suggestions rendered with the search equalizer and find queries that may better suit their needs and preferences. In one embodiment, graphical indicators that can be implemented for instance with colored, grey scale or otherwise representational bars or other graphical symbols. The graphical indicators are displayed next to the representation of each of the verticals and readily and logically symbolize to the user a degree of relevance of each of the verticals for the user's current query. Graphical relevance representation comprises, in one embodiment, a positioning or array of the verticals in which the position connotes the relative relevance. For instance, the most relevant vertical is displayed above all the others with the next most relevant vertical positioned directly below it and so forth, down to the least relevant vertical displayed below all the others.

In one embodiment, a method for processing query data includes receiving a query portion from a client over a network. For each of multiple search contexts, a relevance score is determined, based on the query portion. Each search context corresponds to a different set of information against which queries can be executed. Indication of the relevance scores is provided to the client over the network.

Determining the relevance score and providing indication are performed prior to an input indicating a complete query or in response thereto. The method may also include associating shortcuts with search contexts, selecting a set of shortcuts based, at least in part, on the relevance scores for the search contexts and the association between the shortcuts and search contexts, and sending the set of shortcuts to the client. The shortcuts include links for accessing a web based entity associated with the shortcut. Relevance scores for each search context are determined for the World Wide Web and for each of multiple category-significant web portals.

The query portion includes a character string. Upon receiving an input of the character string, the indication provided includes ranking the category-significant web portals according to the relevance scores displaying them with the client. The method can also include, upon the receiving and/or determining, generating a suggested query and presenting the suggested query with the client. The suggested query has a significant proximity to content and/or context of information associated with the query portion.

The indication includes a graphical representation of each relevance score. Providing the relevance score indication can include displaying the graphical representation with the client. The graphical representation comprises a graph of each of the relevance scores as a function of their associated search context.

Therefore, the tedium, time demand, costs and error probability associated with conventional search techniques are obviated, as are the conventionally common need to repeatedly modify search queries, which economizes on networking and computational resource usage. Users of the embodiments described herein enjoy benefits relating to obtaining query results that have inherently greater relevance, relevant query results based on portions of queries and suggested queries generated that may assist the user in obtaining needed relevant information faster and with less intellectual effort.

Embodiments of the present invention relate to an interactive search equalizer. The interactive search equalizer is described with reference first to an example interactive search engine with which the search equalizer, in one embodiment, is implemented. The interactive search engine is described first in Section I with reference to FIG. 1-4. The interactive search equalizer is described more specifically in Section II with reference to FIG. 5A-8E. However, it is to be emphasized that the interactive search equalizer may be implemented with other search engines besides that described in Section I.

Section I

An Example Search Engine Interface

In one embodiment, the interactive search equalizer is implemented with the example search engine interface described in this section. However, the search engine interface is described in this section by way of illustration and not in any way by limitation. Embodiments of the present invention, an interactive search equalizer, are well suited to implementation with various other search engine interfaces.

The example interface to a search engine assists the user 1) by predicting what the user is searching for based on the character or characters the user has entered so far in the query field of the interface, and 2) by providing search results to the user via the interface without the user having to formally issue the intended query. For each character entered into the query field, that portion of the query entered so far is automatically issued to a query predictor that determines a set of one or more predicted queries that correspond to the portion of the query. The set of predicted queries is determined based on the frequency of previously issued queries alone or also on when the previous queries were issued. The most likely predicted query is processed by a search engine to obtain search results. Both the predicted queries and the search results are provided to the user via the interactive user interface. The predicted queries, when displayed to the user, may be ordered based on their popularity (frequency-based) alone or also on their temporal relevance (time-based).

If the user is not interested in the search results based on the most likely predicted query, the user may select any query in the set of predicted queries. When the user selects a different predicted query in the list, the search results are then updated to display the search results that pertain to the different predicted query.

In addition to displaying the predicted queries and search results to the user via the user interface, other dynamic data may be provided that relate to the most likely predicted query but are not necessarily obtained by the search results, such as advertisements and other related links to websites.

Functional Overview

FIG. 1 illustrates a user interface display, predicted queries, and search results, according to one embodiment of the invention. A user, via a web browser 100, enters characters, which will constitute the user's intended query, into a query field 102. As soon as the first character is entered, and for every subsequently entered character, that portion of the intended query is sent to a query predictor, described below (e.g., FIG. 3A-C). The query predictor determines a set of one or more predicted queries based on the partial query. The predicted queries are sent back to the user and displayed, for example in a drop box 104. The web browser 100 also displays a selected predicted query 108 (hereinafter referred to as the "particular predicted query").

A search engine processes the particular predicted query 108 from the set of predicted queries and sends the search results 112 to the user to be displayed, for example in results page 110. It is thus possible that the user only has to enter one or a few characters before the actual intended query is determined and the results of the intended query are displayed. Therefore, search button 106 may never have to be selected in order for an intended query to be issued.

Query Predictor

In one embodiment of the invention, the portion of the query entered so far by a user is sent from the user's web browser to a query predictor across a network. This may occur for each character, or sequence of characters, entered by the user. The query predictor examines the one or more characters and makes one or more predictions on what the intended query is. The one or more predictions are in the form of one or more completed queries, each of which was a previously issued query. These one or more predictions are sent to and displayed on the user's computer; effectively assisting the user in formulating a query before the user is finished typing the entire intended query in the query field.

The basic assumption behind the query predictor is that it is highly probable that a user intends to issue a query in which at least one other person has issued previously. By using that information, a highly interactive search engine may assist the user in formulating a query, or perhaps aiding the user in refining a query by listing other possible variants of the query that the user would be interested in. Every previously issued query is saved and logged because, if the query was valuable to one user, it has potential value for another user.

In one embodiment, the query predictor extends to other languages and is not exclusive to English. The query predictor may also support other types of strings, such as product names and part numbers where the user may only know a small piece of it.

"Smart" Lexical Completion

The query predictor thus has a searchable database of queries that the query predictor may access once the query predictor has received one or more characters from the user. Based on the partial query, the query predictor determines one or more completed queries from the database of queries that match lexically. However, instead of simply completing the partial query lexically and returning only those queries that begin with the character or characters in the partial query, other queries are also found that contain the lexical completion anywhere in the predicted query. For example, if a user enters the string "th", not only may "theory of evolution" be a predicted query sent to the user, but also "string theory" or "music theory," each of which are not simple lexical completions of "th."

Frequency and Time

In some situations, many previously issued queries may begin with "th." It has been determined that the most useful queries are likely the ones that not only have issued most often (popularity), but also those that have been issued most recently (temporal relevance). Therefore, in one embodiment of the invention, the query predictor biases the resulting set of predicted queries based on their frequency (i.e., number of times the query has issued in the entire query database history), and how often they were issued within a specified time, for instance, within the past week. The fact that the most recently issued queries are biased is based on the premise that a user is more likely to be interested in a subject that many other people are interested in at roughly the same time.

As an example, although "renewable energy sources" may have issued as a query five times more often than "nuclear energy," the partial query "ener" will cause the query predictor to generate "nuclear energy" as the particular predicted query because "nuclear energy" may have been issued much more frequently in the last week due to a hypothetically recent announcement by Congress that 100 nuclear reactors will be constructed.

Figure 2:
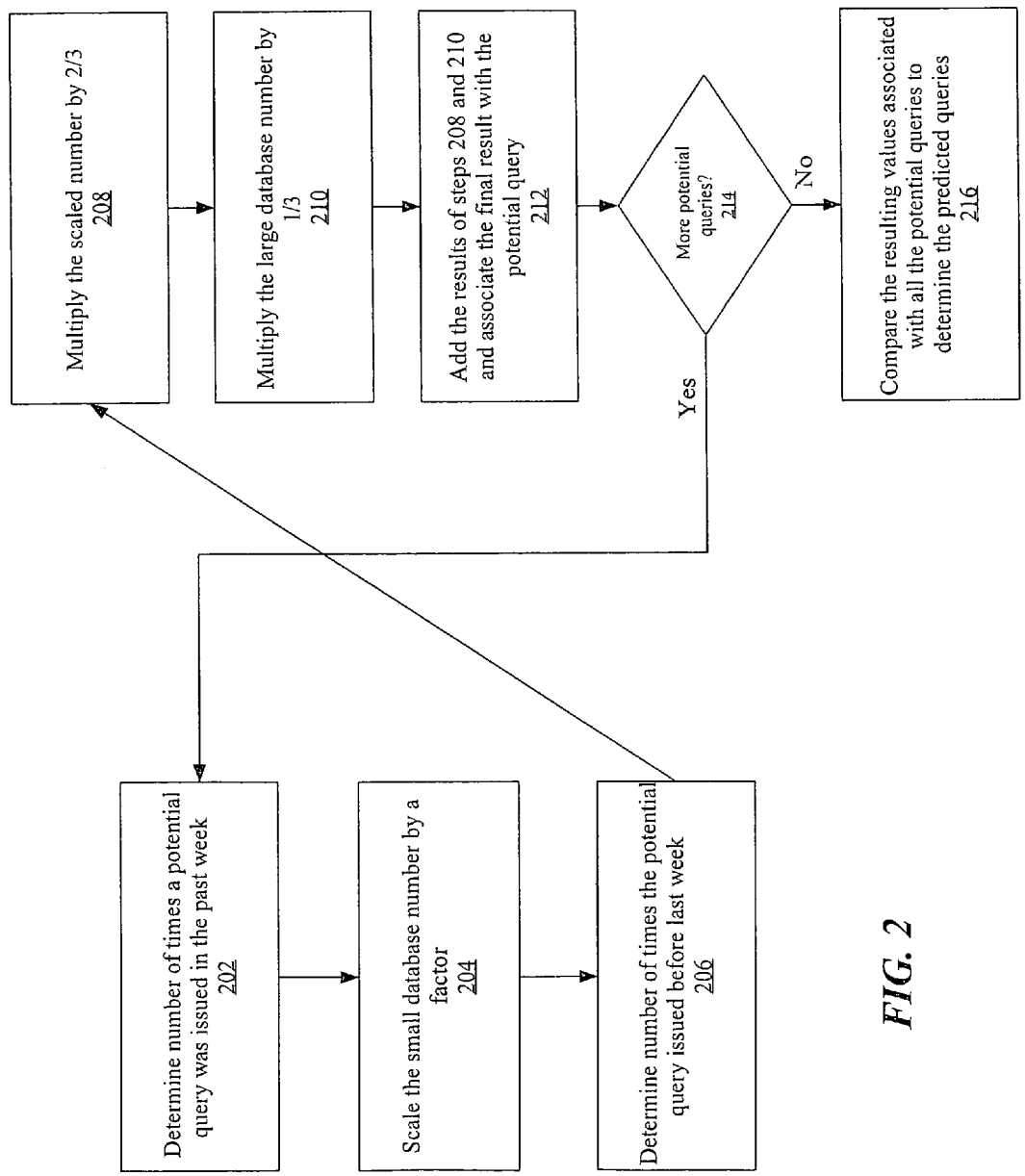
FIG. 2 is a flow diagram that illustrates how temporal relevance is factored into determining which potential queries become predicted queries sent to the user, according to an embodiment of the invention.

In one embodiment, the time component is determined by searching at least two databases, one for relatively recent queries and one for relatively older queries, and then scaling the results from searching the recent database and weighting them accordingly. FIG. 2 illustrates steps in which this embodiment may be implemented. It will be apparent that there are many ways this scaling and weighting may be performed, in addition to the number of "old" query databases and "new" query databases, as the invention is not limited to this particular example. In this embodiment, the query predictor has access to a small database of all queries that issued in the last week and to a large database of all queries that issued before a week ago. When searching the small database for potentially valuable predicted queries, the number of times a potential query is found in the small database is scaled based on a factor. This factor is the ratio of the number of times a moderately popular query is found in the large database to the number of times that same moderately popular query is found in the small database. For example, suppose that "Yahoo" is a moderately popular query over the last week and over the past few years. If "Yahoo" is found in the large database 1.7 million times, and 25 thousand times in the small database, then the factor would be 1.7 million/25 thousand, or 68.

Query prediction would be less effective if a moderately popular query in both the small and large databases were not used to scale. If a query was popular only in the large database and but not in the small database, then the scaling factor would be skewed. For example, if the query "floppy disk" were used as the scaling factor and it was queried many times in the history of the large database but was queried only a few times in the previous week, for the simple reason that no one produces or uses floppy disks anymore, then the ratio between the large and small databases would be enormous. This would skew the results of a partial query by heavily weighting relatively recent queries to the detriment of relatively older, and potentially more valuable, queries.

A similar problem would exist if a new query was used as the scaling factor that was only issued in the past week but rarely issued in the history of the large database. For example, "nuclear energy" may be an infrequently issued query in the past. But, because of a hypothetically recent announcement by Congress that 100 nuclear reactors will be constructed, the query "nuclear energy" will likely be issued thousands, if not hundreds of thousands of times. In that case, the scaling factor would be quite small; and when a query in the small database is weighted against the queries in the large database, then relatively older predicted queries, rather than relatively newer, and potentially more valuable, predicted queries, would most likely be returned to the user.

Therefore, referring to FIG. 2, after the query predictor determines, in step 202, the number of times a given potentially valuable query was issued in the small (i.e. recent) database, the number is scaled, in step 204, by 68, which is based on the scaling factor determined above with "Yahoo" as the scaling query. The resulting scaled value essentially indicates that the potential queries in the small database are equal in weight to the potential queries in the large (i.e. old) database. Subsequently, the query predictor determines, in step 206, the number of times the potential query appears in the large database of "older" queries.

At this point, a weight is applied to the potential queries in the small database versus the potential queries in the large database. This is performed by multiplying the result of the scaled small database number by ⅔ and adding it to the result of multiplying the number of times the potential query was found in the large database by ⅓ (see steps 208-212). Steps 202-212 are performed for each potential query determined by the query predictor. When there are no more potential queries to process (214), all the potential queries are then compared with each other (step 216) based on their respective values determined for each potential query at step 212. The two or more queries (e.g., ten) with the highest values become the predicted queries, which are subsequently sent to the user.

Search Engine

In one embodiment of the invention, the search engine component processes the particular predicted query (i.e. the most likely intended predicted query) that a user would be interested in. The particular predicted query is processed to obtain search results. The search engine that may be used for this purpose is common in the art and requires no further description.

The search results obtained by the search engine are sent to and displayed on the user's computer. If the particular predicted query is the user's intended query, the search results based on the particular predicted query may appear on the user's monitor even before the user enters another character in the query field and very likely before the user finishes entering the full intended query. If the particular predicted query is not the user's intended query, then the user may select a different predicted query in the list or continue typing, at which time a new set of search results, based on the selected or new particular predicted query, will be displayed via the user interface.

Providing Predicted Queries and Search Results

Figure 3A:
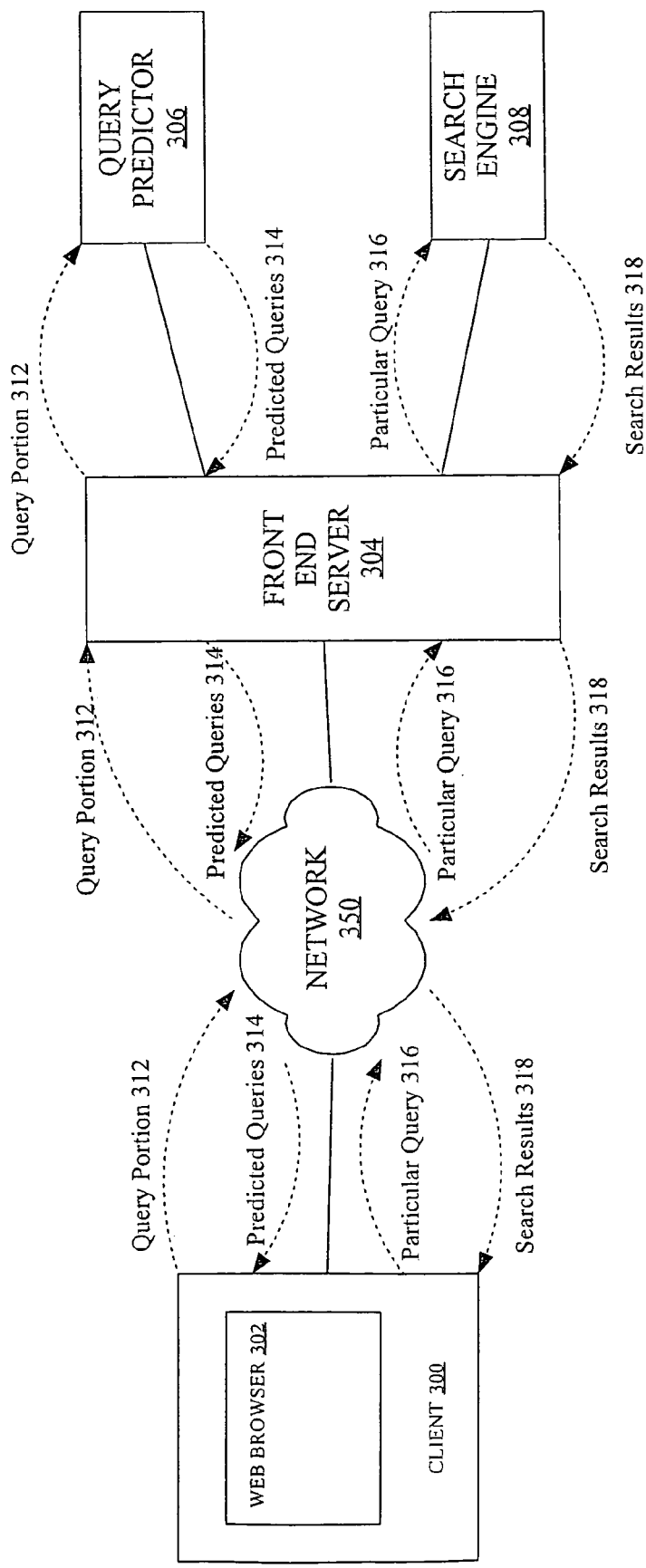
FIG. 3A is a block diagram that illustrates the communication between a web browser on a client and a front end server, according to an embodiment of the invention.

FIG. 3A is a block diagram that illustrates one way a partial query is processed and how the results of the partial query are returned, according to one embodiment of the invention.

A user at a client 300 enters a partial query in a web browser 302. The partial query 312 is sent to a front end server 304 over a network 350. Front end server 304 is not a necessary element in any embodiment of the invention. Its main purpose is to add security to the interactive search engine system. Network 350 is also not a required element in any embodiment, but is merely illustrated to show one approach in which the invention may be implemented. Network 350 may be a local area network (LAN), a wide area network (WAN), or the Internet. Front end server 304 forwards partial query 312 to a query predictor 306, discussed above, which processes the partial query.

Front end server 304, query predictor 306, and a search engine 308, or any combination thereof, may be implemented on the same device. However, for the purpose of illustration and simplification, they each reside on different devices.

Query predictor 306 determines a set of one or more predicted queries based on the partial query and sends them 314 back to front end server 304. Along with the set of predicted queries, query predictor 306 sends additional data indicating which of the predicted queries in the set is the particular predicted query. Either query predictor 306 determines which predicted query is the particular predicted query or web browser 302 is given sufficient information to make that determination. Front end server 304 then forwards the predicted queries 314 and the data indicating the particular predicted query to client 300 over network 350 to be displayed on web browser 302.

Upon receipt of the set of predicted queries, web browser 302 sends particular predicted query 316 over network 350 to front end server 304, which forwards particular predicted query 316 to search engine 308. Search engine 308, described above, processes the particular predicted query to obtain search results. The search results 318 are finally sent to front end server 304, which forwards them 318 to client 300 over network 350.

One advantage of this implementation is that the predicted queries are sent immediately to the user as soon as they are determined. However, this implementation also illustrates the possibility that for every character the user types into the query field of his web browser, there are two complete round trips that a communication has to make between client 300 and front end server 304.

Figure 3B:
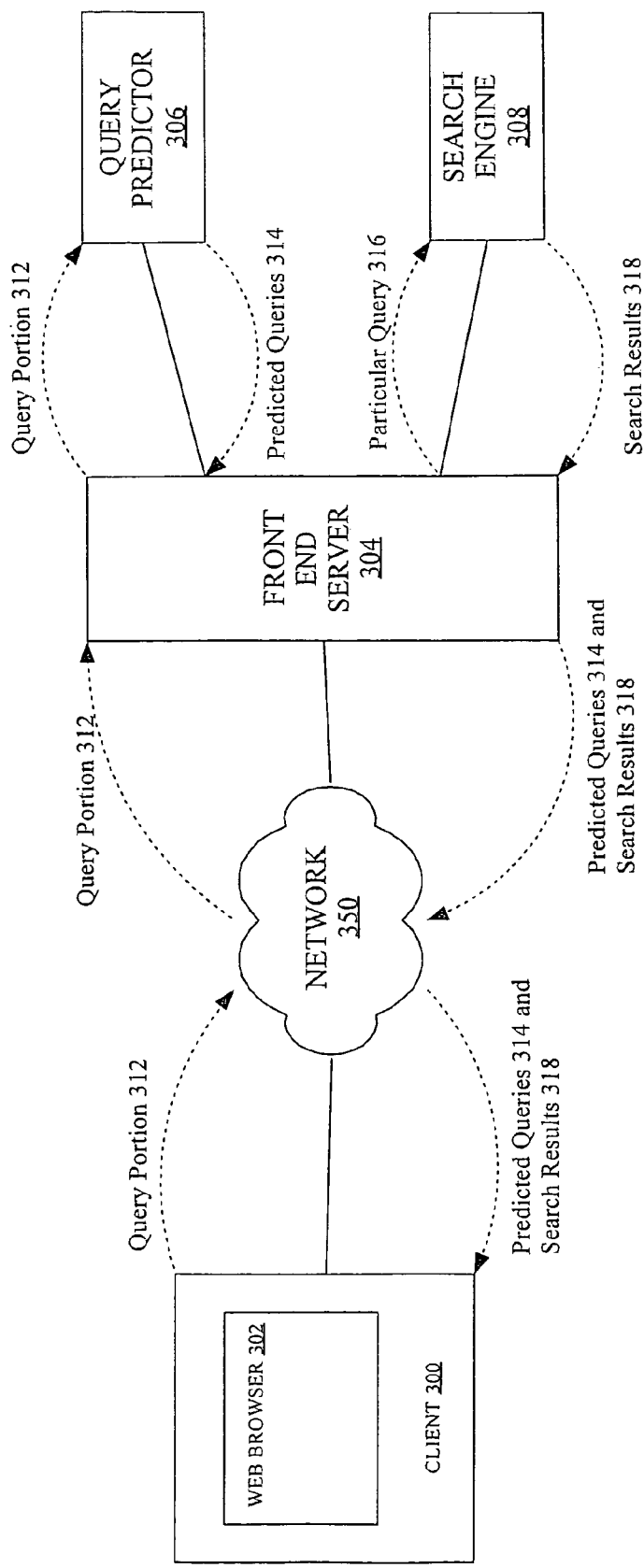
FIG. 3B is a block diagram that illustrates the communication between a web browser on a client and a front end server, according to another embodiment of the invention.

FIG. 3B is a block diagram that illustrates a different way in which a partial query is processed and how the results are returned to the user, according to another embodiment of the invention.

A user at client 300 enters a partial query in a web browser 302. Partial query 312 is sent to front end server 304 over a network 350. Front end server 304 forwards partial query 312 to query predictor 306, which processes the partial query.

Query predictor 306 determines a set of one or more predicted queries based upon the partial query and sends them 314 to front end server 304. Instead of immediately forwarding the predicted queries to client 300, front end server 304 retains the predicted queries and sends search engine 308 the particular predicted query 316. Again, along with the set of predicted queries, query predictor 306 sends additional data indicating which of the predicted queries in the set is the particular predicted query. Either query predictor 306 determines which predicted query is the particular predicted query or front end server 304 is given sufficient information to make that determination.

Search engine 308 processes the particular predicted query to obtain search results. The search results 318 are sent to front end server 304, at which time front end server 304 forwards both predicted queries 314 and search results 318 to client 300 over network 350.

In the absence of front end server 304, query predictor 306 sends the predicted queries 314 and to search engine 308, which subsequently sends the predicted queries 314 and search results 318 to client 300 over network 350.

One advantage of this implementation is that there is less communication (i.e., traffic) between client 300 and front end server 304. However, the predicted queries may not display on the user's web browser 302 as quickly as in the previous embodiment because the predicted queries must "wait" for the search results to be produced and sent to front end server 304 before the predicted queries are forwarded to client 300.

Figure 3C:
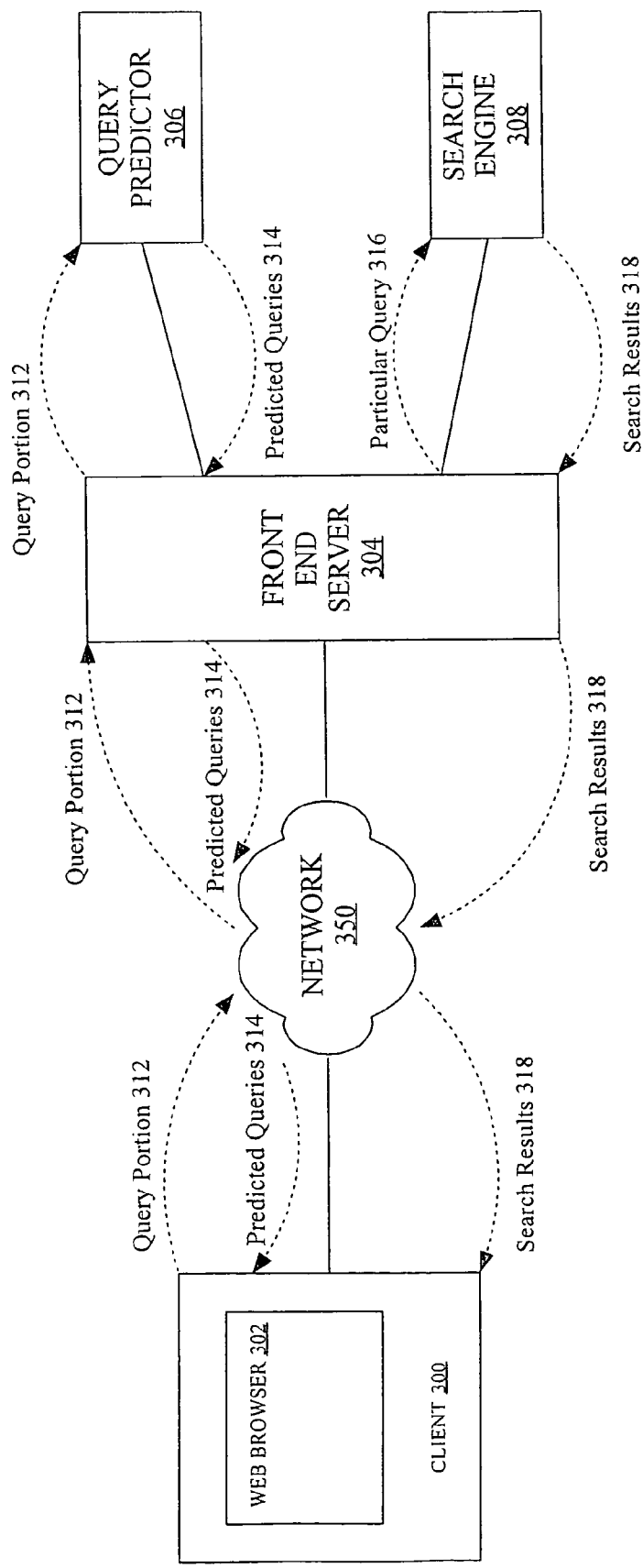
FIG. 3C is a block diagram that illustrates the communication between a web browser on a client and a front end server, according to another embodiment of the invention.

FIG. 3C is a block diagram that illustrates a different way in which a partial query is processed and how the results are returned to the user, according to another embodiment of the invention.

A user at client 300 enters a partial query in a web browser 302. Partial query 312 is sent to front end server 304 over network 350. Front end server 304 forwards the partial query 312 to query predictor 306, which processes the partial query.

Query predictor 306 determines a set of one or more predicted queries based upon the partial query and sends them 314 to front end server 304. Again, along with the set of predicted queries, query predictor 306 sends additional data indicating which of the predicted queries in the set is the particular predicted query. Either query predictor 306 determines which predicted query is the particular predicted query or front end server 304 is given sufficient information to make that determination.

Instead of "holding on" to the predicted queries, as in the last embodiment, front end server 304 sends the predicted queries 314 to client 300 over network 350 and sends particular predicted query 316 to search engine 308 at substantially the same time. It is also possible for query predictor 306 to send the particular predicted query to search engine 308 directly.

Search engine 308 processes the particular predicted query to obtain search results. The search results 318 are sent to front end server 304, at which time front end server 304 forwards search results 318 to client 300 over network 350. In the absence of front end server 304, query predictor 306 sends both the predicted queries 314 and the particular predicted query 316 to search engine 308, after which search engine 308 sends predicted queries 314 and search results 318 to client 300 over network 350.

In the absence of front end server 304, query predictor 306 sends both predicted queries 314 and the particular predicted query 316 to search engine 308, which subsequently sends predicted queries 314 and search results 318 to client 300 over network 350.

The advantage of this implementation compared to the embodiment described in FIG. 3A is that there is less traffic between client 300 and front end server 304. The advantage compared to the embodiment described in FIG. 3B is that the predicted queries do not have to "wait" for the search results to be produced and sent to front end server 304 before the predicted queries are forwarded to client 300. Thus, the predicted queries are sent immediately upon their production and less communication is required between client 300 and front end server 304.

User Interface

In one embodiment of the invention, as illustrated in FIG. 1, the user interface includes at least 1) a query field 102 where a user enters characters that will constitute the partial query, 2) a drop down box 104 that lists the set of one or more predicted queries, 3) a search results page 110, and 4) a "Search" button 106. The search button may be in the form of any mechanism that allows the user to select the query the user enters, in case the user is not satisfied with any of the predicted queries provided by the interactive search engine. The set of predicted queries listed in drop down box 104 may be represented in almost any other type of user interface element, including, but not limited to, a text box, list box, menu, or context menu. The user interface may be viewed using a web browser, such as Internet Explorer or Mozilla Firefox.

In one embodiment, the set of predicted queries are listed, beginning at the top, in order of the most likely predicted query to the least likely predicted query.

Modifications

In addition to the user interface, query predictor, and search engine described above, the interactive search engine may be modified in many ways to alter the look, feel, and responsiveness of the search experience.

Tabs

For instance, the user interface includes tabs, such buttons or links 122 in FIG. 1, wherein the user may select a subsection of possible queries and search based on that subsection. With a collection of tabs or "search verticals," such as "Web," "Images," "Video," and "Shopping," a user may select different query sets. The data for which the query predictor is predicting is different based on what the user is interested in, which data is narrowed by using these tabs. For example, if the user is interested in shopping for a product, the user selects the "Shopping" tab. The user then begins to enter a product name or service in query field 102. The query predictor is not only sent the partial query but also the shopping selection information, indicating that the user is searching for a particular product or service, wherein the query predictor returns only those predicted queries that pertain to products and services.

Keywords

Often when a query is issued, the order of words in the query is unimportant. As alluded to earlier, the issued query does not have to be in English. In other embodiments, not only are other natural languages supported, but also non-natural strings, such as product names and part numbers where the user may only know a portion of the non-natural string. Therefore, the term "word" as used herein may include an English word, a Korean word, or a product number.

When a user enters two or more words in the query field, the user is not necessarily concerned that the search engine returns a link to a web accessible document that contains the two or more words in the order that they were entered. Rather, the user is interested in a web accessible document that merely contains those words, in whatever order they are found.

For example, a user enters "solar wind water power" in the query field. The user does not particularly care about the order. The user is rather interested in queries that contain the words "solar," "wind," "water," and "power" somewhere in the query. The query predictor determines what words are important in the query and which words are not important, and then predicts queries based on the important words instead of predicting queries based simply on a matching substring.

Delay Results

In another embodiment, the step of displaying the predicted queries and/or the search results is delayed. Instead of immediately returning predicted queries, the query predictor "waits" until certain criteria is satisfied (such as the lapse of a specified amount of time or when a few characters are entered, or both) before the predicted queries and search results are displayed. This additional step of waiting assumes that the user may not be sure what he/she wants to query on. Thus, the predicted queries are delayed until the interactive user interface determines, based on the waiting criteria, that this is what the user truly intends to query on. Once the waiting criteria are satisfied, the partial query is processed by the query predictor and the search engine, as described above.

Other Dynamic Data

There are additional ways to aid users other than to predict the intended query and return the appropriate search results. In another embodiment, advertisements that appear on the interactive user interface change based on the particular predicted query returned from the query predictor. Thus, every time the particular predicted query changes, new advertisements that relate to the query are posted on the user interface and advertisements that related to an older and non-relevant query are deleted from the user interface. For instance, if a user types "elli" and the query predictor determines "elliptical" as the particular predicted query, advertisements that relate to exercise equipment will appear on the user interface.

In addition to advertisements, other dynamic information may be useful to the user when submitting a query. In another embodiment, information relating to a particular predicted query but not found in the search results are displayed to the user via the user interface. Extending the "theory" example used above, the query predictor determines that "theory" is the particular predicted query for the partial query "th" entered by the user. The query predictor, or perhaps another program, determines that "theory" is associated with "string theory," "music theory," and "math theory" and returns these related subjects to be displayed in the form of predicted queries or in a different form on the user interface. For short queries like "theory," this additional information happens to be the same set as what the query predictor would produce.

However, if the user entered "interna" in the query field and the query predictor determined that the particular predicted query is "international trade" then the query predictor, in addition to the predicted queries, would return queries that are not lexical completions of "international trade," but rather queries related to the topic of international trade. Such queries could be on GATT, WTO, UN, US trade policies, etc. A program separate from the query predictor could also perform this function.

Clearly, this aspect of the invention is not performing query prediction, but rather is providing the user with dynamic, related, and hopefully helpful information. A principle in providing advertisements, additional queries, and other related information is to keep everything that is displayed via the user interface consistent with what the query predictor "believes" is the user's intent, which the query predictor determines from the partial query.

Implementation Mechanisms

Figure 4:
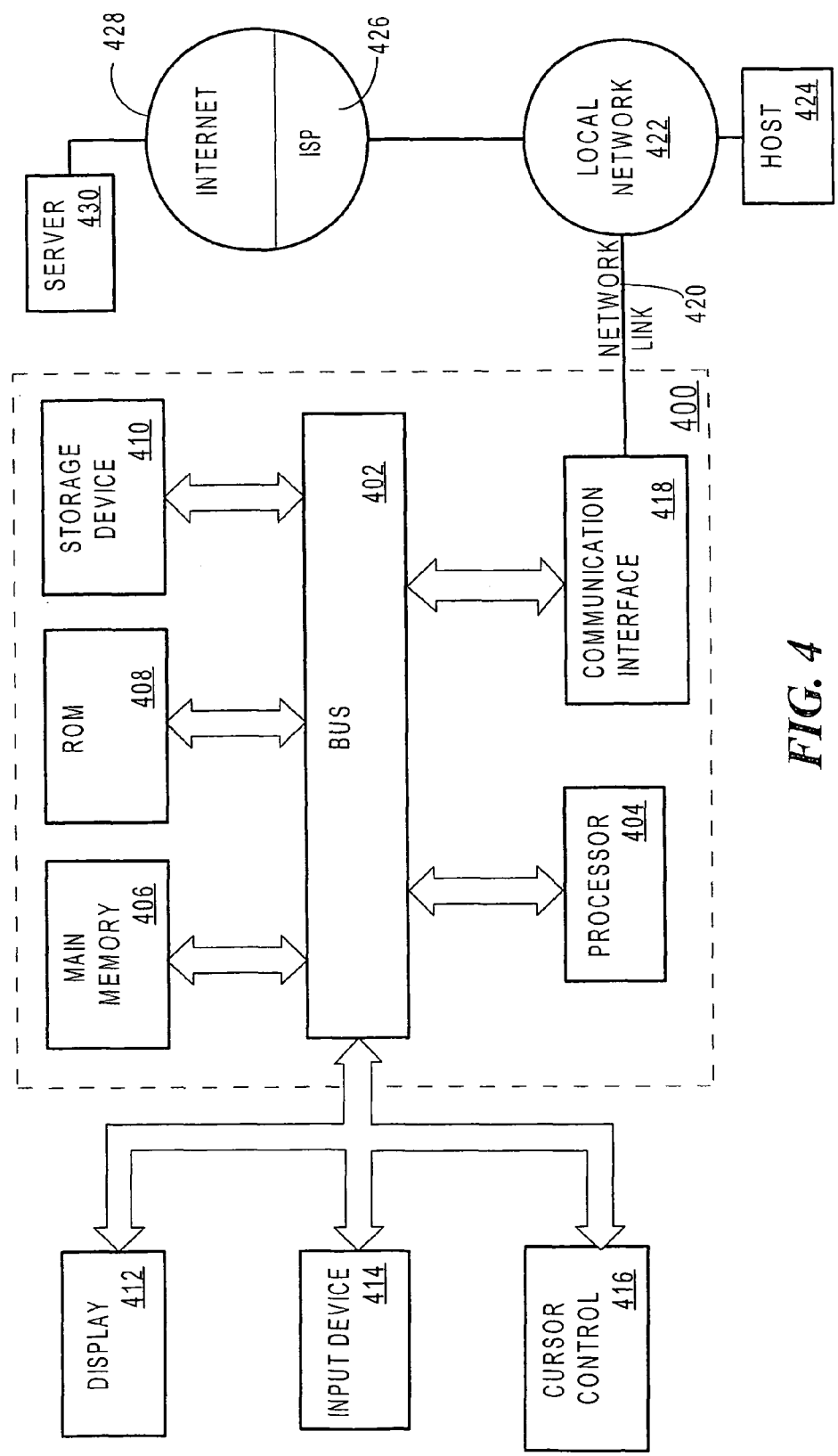
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Section II

Search Equalizer

A search equalizer is described herein. In Section I above, an example interactive search engine is described with reference to FIG. 1-4 with which an embodiment of the present invention, a search equalizer may be implemented. It should be understood that the interactive search engine described in Section I is but one platform with which the search equalizer described herein may be practiced and that the interactive search engine is described above by way of illustration and not by any means limitation. Embodiments of the present invention are well suited to implement a search equalizer with any of a variety of search engines.

A method for processing query data includes receiving a query portion from a client over a network. For each of multiple search contexts, a relevance score is determined, based on the query portion. Each search context corresponds to a different set of information against which queries can be executed. Indication of the relevance scores is provided to the client over the network.

Determining the relevance score and providing indication may be performed prior to an input indicating a complete query or in response thereto. The method may also include associating tags with search contexts, selecting a set of tags based, at least in part, on the relevance scores for the search contexts and the association between the tags and search contexts, and sending the set of tags to the client. The tags include links for accessing a content location such as a web page or a similar web based entity associated with the tag. Relevance scores for each search context are determined for the World Wide Web and for each of multiple category-significant web portals.

The query portion includes a character string. Upon receiving an input of the character string, the indication provided includes ranking the category-significant web portals according to the relevance scores displaying them with the client. The method can also include, upon the receiving and/or determining, generating a suggested query and presenting the suggested query to the client. The suggested query has a significant proximity to content and/or context of information associated with the query portion.

The indication may include a graphical representation of each relevance score. The graphical representation may comprise a graph of each of the relevance scores as a function of their associated search context. Providing the relevance score indication can include displaying the graphical representation with the client.

Example Process

Figure 5A:
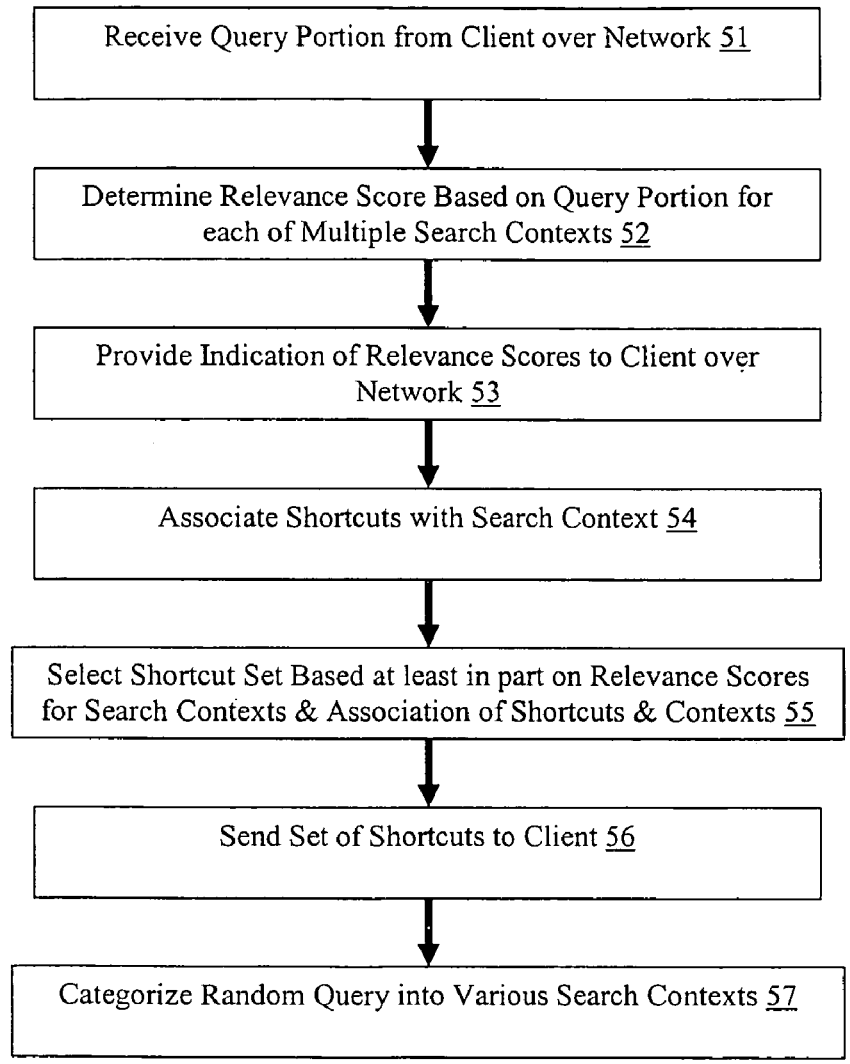
FIGs. 5A-5C depict flowcharts for example processes for processing query data, according to embodiments of the invention.

FIG. 5A depicts a flowchart for an example process 50 for processing query data, according to an embodiment of the invention. Process 50 begins with step 51, wherein a query portion is received from a client over a network. As used herein, a query portion refers to a part of a query (e.g., a partial query) or complete query. A partial query comprises a query portion executed essentially in real time as a user is actively inputting a string of characters associated with a query. A complete query comprises a query potion executed upon a user input that indicates that a character string associated with a query portion is essentially fully composed according to the user's satisfaction. User inputs that connote a complete query include activating an 'enter' or 'return' key on a keyboard or the like and/or an input with a graphical user interface (GUI) or another user interface such as clicking on a 'Search', 'Go', 'Get', 'Find' or similar radio button.

In step 52, a relevance score is determined based on the query portion for each of multiple search contexts. Each search context corresponds to a different set of information against which queries can be executed. In one implementation, one set of information is the Web, e.g., the World Wide Web (popularly referred to as "www") and other sets of information are one or more verticals. As used herein, a vertical refers to a search context, a category leading web portal, web site, etc. in a given, particular, relatively non-generalized and/or somewhat more specialized topical category and/or catering to the informational interests of a given, relatively non-generalized demographic group. Verticals are described in more detail hereinafter. In step 53, an indication of the relevance scores is provided to the client over the network.

In one embodiment, determining a relevance score and providing indication thereof is performed prior to receiving an input that indicates that the query portion represents a complete query. Thus, the present embodiment advantageously provides the relevance data based on a mere string of characters that may comprise a partially formed query and allows suggestions to be provided to users for completing the query, as discussed below. In one embodiment, determining a relevance score and providing indication thereof is performed in response to receiving an input that indicates that the query portion represents a complete query. This has the benefit of responding with relevance data to a user's well-formulated query.

In one embodiment, process 50 continues with step 54, wherein shortcuts are associated with search contexts. In one embodiment, shortcuts comprise links (e.g., hyperlinks) to a content location such as a web page. In step 55, a shortcut is selected, at least in part, based on the relevance scores for the search contexts and the association between the tags and the search contents. In step 56, a set of shortcuts selected from the search context deemed most relevant (e.g., having the highest relevance score), the top two (or another relatively small number) most relevant search contexts, etc., are sent to the client. In one implementation, the shortcuts are interactively displayed with the client to users who may conveniently access the content locations with an input based on the shortcut, such as clicking thereon.

In one embodiment, process 50 continues with step 57. In step 57, a random query is categorized into various search contexts (e.g., verticals). Categorizing a random query into various search contexts is effectuated in one implementation with a general or other query understanding Application Program Interface (API).

Figure 5B:
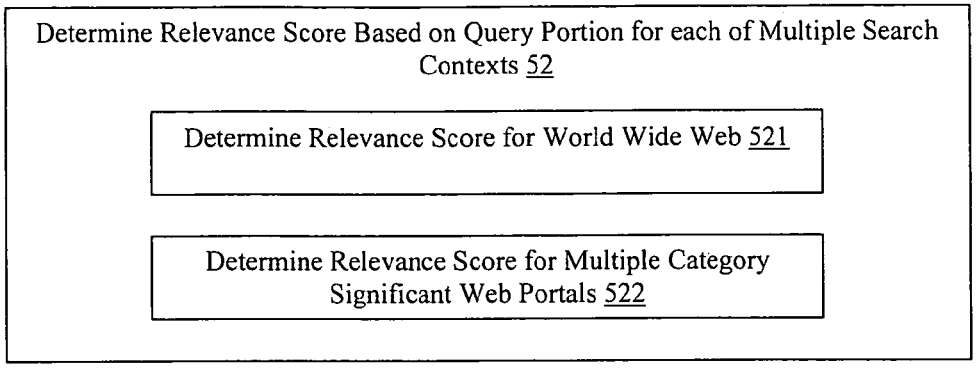

FIG. 5B depicts the determination of the relevance score based on a query portion for each of multiple search contexts of step 52 in somewhat greater detail. In step 521, a relevance score is determined for the World Wide Web, essentially in its entirety. In step 522, a relevance score is determined for multiple category-significant web portals, e.g., verticals, etc. Thus, relevance scores may be determined for Web based searches and for searches over one or more particular verticals, allowing users to compare and choose between them, which advantageously promotes effective and efficient relevant search composition. In various embodiments, step 52 of process 50 comprises one or more of steps 521 and 522.

Figure 5C:
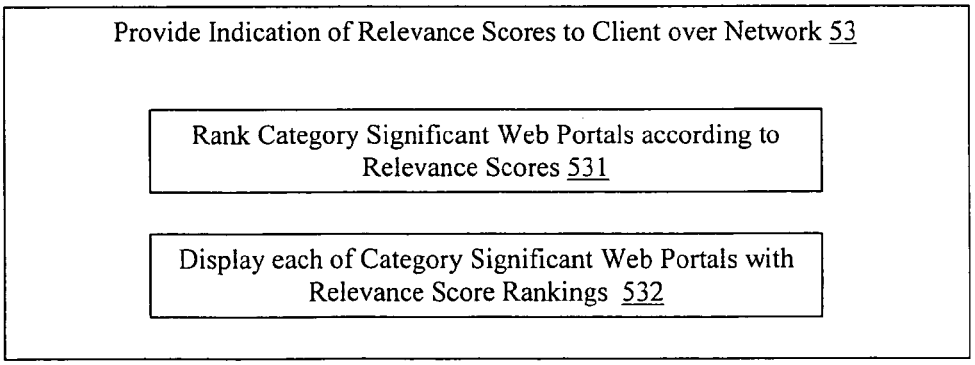

FIG. 5C depicts the provision of the relevance scores to the client over the network of step 53 in somewhat greater detail. In step 531, category-significant web portals such as verticals are ranked according to their relevance scores. In step 532, the category-significant web portals are displayed with their corresponding relevance score rankings. In one implementation, the relevance score rankings are displayed graphically, such as a relevance representative graph appearing proximate to the representation of the vertical or other category-significant web portal. Thus, relevance scores may be displayed for Web based searches and for searches over one or more particular verticals, allowing users to compare and choose between them. This has the benefit of promoting effective and efficient selection of search contexts for queries that have a higher probability of returning relevant results. In various embodiments, step 53 of process 50 comprises one or more of steps 531 and 532.

In one embodiment, process 50 is performed with one or more processors executing machine readable program code encoded in a tangible computer readable medium such as described above with reference to FIGS. 3A, 3B and/or 4. In one embodiment, process 50 is performed with one or more processors of components of a network based system executing machine readable program code encoded in a tangible computer readable medium such as described below with reference to FIG. 6.

Example System

Figure 6:
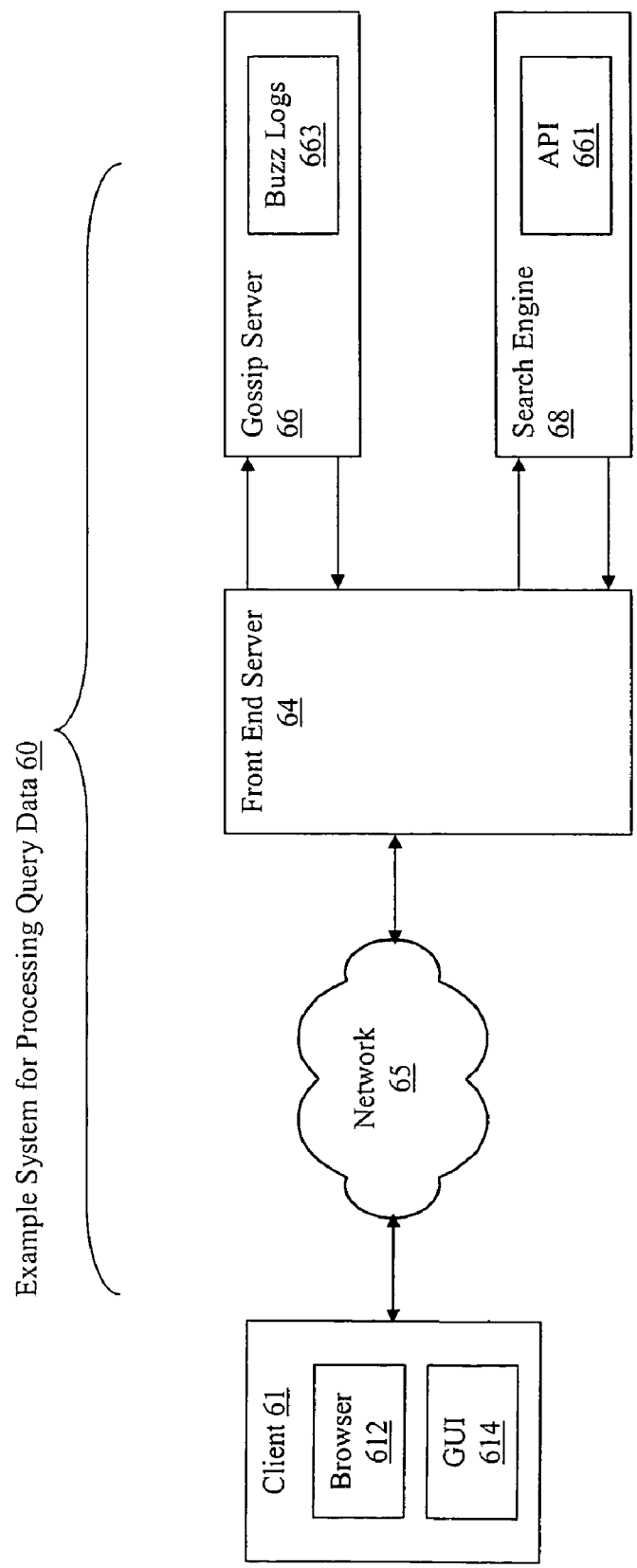
FIG. 6 depicts an example system for processing query data, according to an embodiment of the invention.

FIG. 6 depicts an example system 60 for processing query data, according to an embodiment of the invention. In one embodiment, system 60 comprises subsystems and/or components such as those described in Section I with reference to FIGS. 3A-B and 4. System 60 has a network 65. Network 65 comprises, in various implementations, one or more of a variety of computer and/or communication networks including a LAN, WAN, subnet, internetwork and/or the Internet. In one embodiment, components of system 60 are configured for processing data related to queries and query portions with program functions that comprise steps such as those of process 50, described with reference to FIGS. 5A-C.

A client 61 is communicatively coupled to network 65. Client 61 hosts a web browser application 612 and a user interface such as a GUI 614, which allow users to input queries and portions thereof, such as may take the form of one or more strings of characters entered in an interactive text field. Client 61 is coupled via network 65 to a front end server 64, which receives, handles and processes queries and query portions therefrom.

A gossip server 66 is communicatively coupled to the front end server 64 and generates suggested queries based on query portions. The gossip server 66 also outputs frequencies of the suggestions for categorizing queries and ascribing relevance thereto, e.g., as described with reference to FIG. 7 below. Gossip server has buzz logs 663, which compiles frequencies, statistics and/or related, similar or other data that relate to frequencies of suggestions, query suggestions, relevance, etc. In one embodiment, the gossip server 66 comprises an engine such as is described in co-pending U.S. patent application Ser. No. 11/313,525, filed on Dec. 21, 2005 by Richard Kasperski and assigned to the Assignee of the present application, which to the extent not repeated herein, is fully incorporated herein by reference in its entirety for all purposes.

A search engine 68 is communicatively coupled to front end server 64 and processes queries and query portions with functions relating to searching for information related to the queries and query portions. In one implementation, search engine 68 is configured for associating tags, which comprise links for accessing an associated content location, with search contexts, such as verticals, other portals and/or the World Wide Web. The search engine 68 selects tags based, at least in part, on the relevance scores for each search context and the association between the tags and the search contexts. Search engine 68 then sends the tags to client 61, e.g., with front end server 64 and network 65. In one embodiment, search engine 68 has a general (or other) query-understanding API 661. Where the query portion is associated with a random query, API 661 categorizes the query portion into the various search contexts (e.g., verticals). In another implementation, API 661 is disposed in front end server 64 and/or elsewhere in system 60.

Categorizing Queries Example Process

Figure 7:
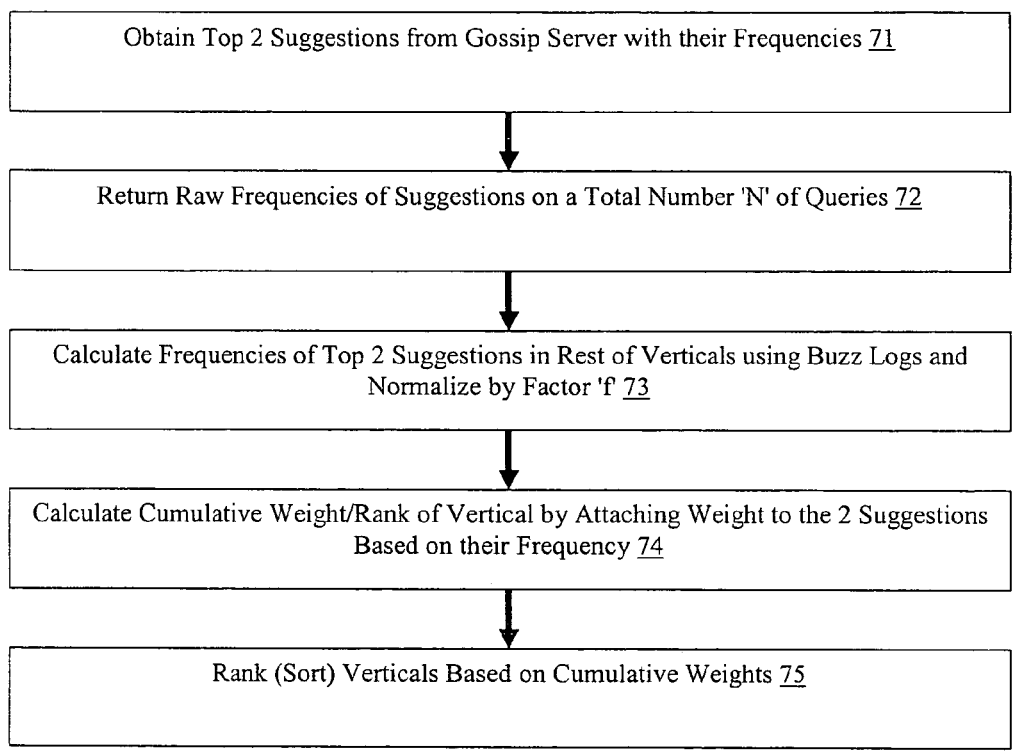
FIG. 7 depicts an example process for categorizing queries, according to an embodiment of the invention.

FIG. 7 depicts an example process 70 for categorizing queries, according to an embodiment of the invention. In one embodiment, one or more steps of process 70 are performed with functionality associated with a gossip server (e.g., gossip server 66; FIG. 6). Process 70 begins with step 71, wherein the top two suggestions are obtained from the gossip server along with the frequencies associated therewith.

In step 72, the gossip server returns the raw frequencies of the suggestions on a total number 'N' of queries. The query population N can be quite large in some large portal based implementations. For instance, when deployed and used with a large web portal such as Yahoo™, N is a number of approximately 1.1 billion queries. In step 73, the frequencies of the top two suggestions are calculated in the remaining search contexts, verticals, category leading web portals, web sites, etc., in one embodiment using buzz logs (e.g., buzz logs 663; FIG. 6). The frequencies are normalized by a factor 'f'.

Factor f varies for the different search contexts, verticals, category leading web portals, web sites, etc. For a given search context, vertical, category leading web portal, web site, etc., $$f=N/(\text{total number of queries in that vertical}) \quad \text{(Equation 1).}$$

In one implementation, N is a number much greater than the total number of queries in a particular vertical, etc. For instance, in one example implementation, buzz logs from a half year's verticals are used. In another, a year of logs compiling such data is used.

In step 74, the cumulative weight, rank, etc. of a given search context, vertical, category leading web portal, etc. is calculated. In one implementation, the weight/rank of the given search context, vertical, category leading web portal, etc. is calculated by attaching weight (e.g., ascribing numerical significance) to the two top suggestions based on their respective frequencies. The cumulative weight of the two top suggestions is calculated in one embodiment according to Equation 2, below.

$$W_{cum}=f1*(f1/(f1+f2))+f2*(f2/(f1+f2)) \quad \text{(Equation 2).}$$

The weights attached to the suggestions are proportional to their frequencies. This ensures that proper authority is attached to each of the suggestions and deters bias in favor of any.

In step 75, the verticals are ranked (e.g., sorted) based on their cumulative weight numbers. In one embodiment, the gossip server comprises an engine described with reference to gossip server 66 (FIG. 6) above.

Example Screen Shots

Figure 8A:
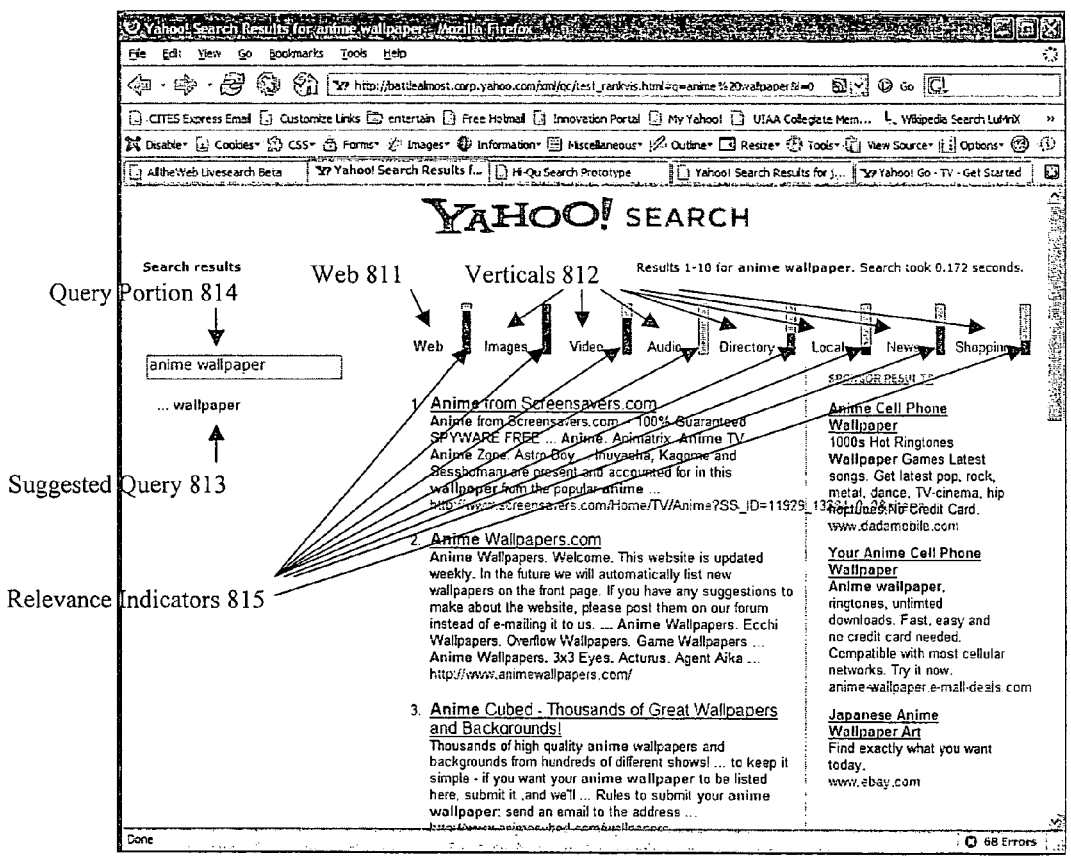
FIG. 8A-8E depict example screen shots showing multiple verticals with query relevance thereto graphically ascribed, according to an embodiment of the invention.
Figure 8B:
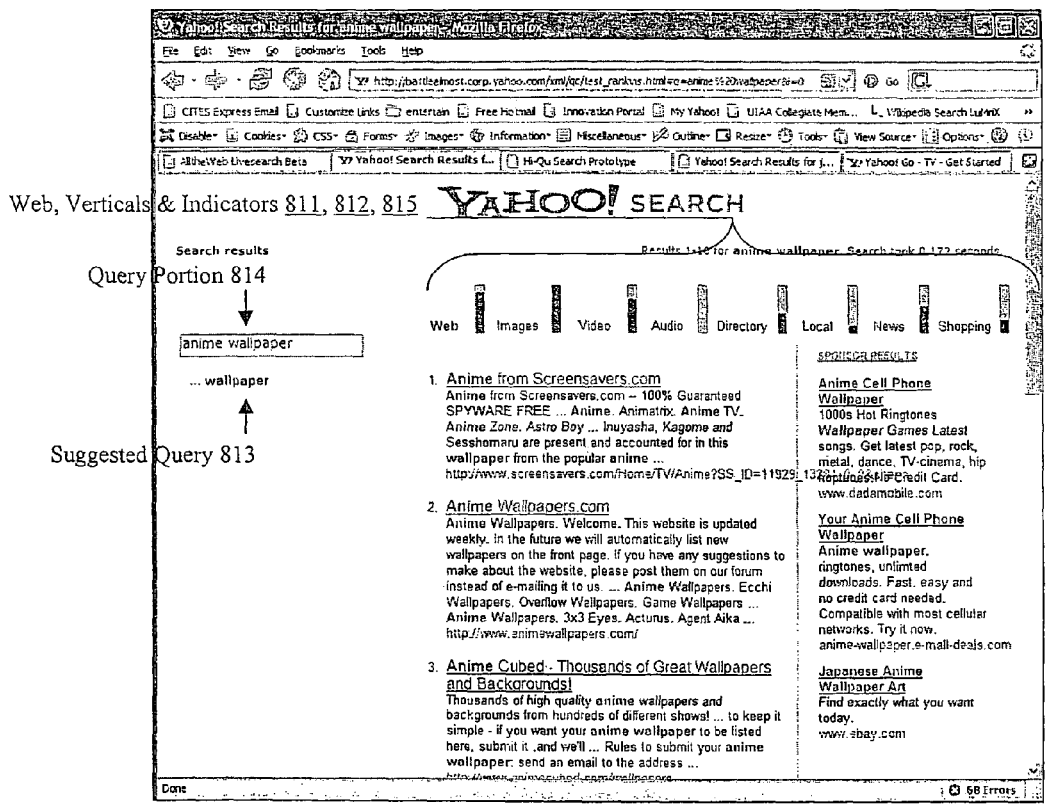

FIG. 8A-8E depict example screen shots showing multiple verticals with query relevance thereto graphically ascribed, according to an embodiment of the invention. FIGS. 8A and 8B depict a screen shot 81 of an example window as rendered with web browser 612 on a display monitor associated for instance with client 61 and allowing user interaction with GUI 614 (FIG. 6). Web indicator 811 ("Web 811") and vertical indicators 812 ("Verticals 812") depict various search contexts.

Web indicator 811 shows a search context that essentially includes the World Wide Web in its substantial entirety. Vertical indicators 812 show eight example search contexts as verticals (e.g., category leading and/or specific web portals), however, any number of verticals can be shown. Relevance indicators 815 graphically display the relative relevance of each of search contexts 811 and 812.

A query portion 814 reading (as an example) "anime wallpaper" has been entered by a user into the text input field shown, below which suggested query 813 that has been generated in response to entering each character of the character string comprising the query portion 814. The suggested query reads (as an example) " . . . wallpaper." The relevance indications in relevance indicators 815 and/or the suggested query 813 change dynamically as the character string is added on the fly to by the user in composing the query portion 814. This provides the user with beneficial real time relevance input and query suggestions based on the query portion 814. The query portion 814 thus grows dynamically as users add to the character string thereof. The query portion 814 can also comprise a complete query, which can be initiated with a user input indicative thereof, such as clicking 'enter', 'return', and/or a GUI based radio button feature such as one labeled "search," "go," "find" or the like.

As seen in screen shot 81, the most relevant search context for query portion 814 is revealed with the relevance indicators 815 to be the vertical "images." The Word Wide Web is shown to be the next most relevant search context, followed by the vertical "Video." The other verticals show significantly less relevance. Thus, a user can increase the probability of greater relevance in query results by running the search in the "images" vertical, in contrast to any of the other search contexts. However, this relevance array may change with a different query portion 814, as may the suggested query 813, etc., as shown in FIG. 8C.

Figure 8C:
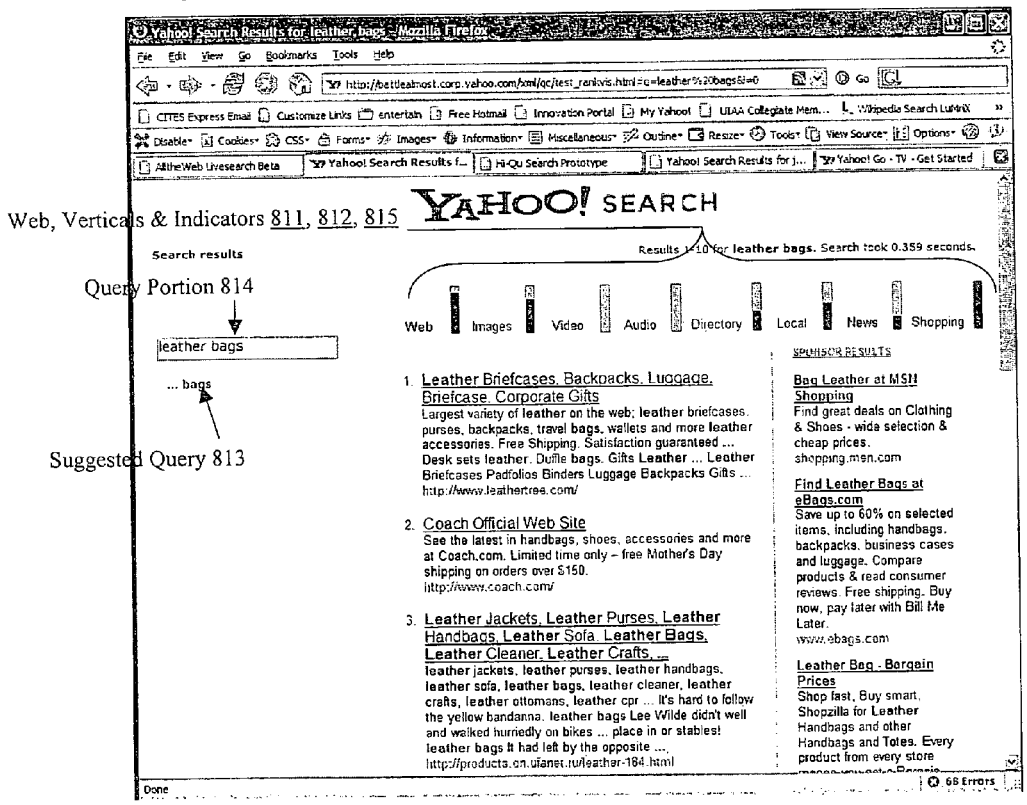

FIG. 8C depicts another example screen shot 82 of an example window as rendered with a web browser on a display monitor associated with a client and allowing user interaction with a GUI. Web indicator 811 and vertical indicators 812 again depict various search contexts. In FIG. 8C, the query portion 814 entered into the interactive text field now reads "leather bags." Screen shot 82 shows that the search contexts have different relevance scores indicated with relevance indicators 815 than in screen shot 81. In screen shot 82, the vertical 812 that corresponds to "shopping" now has heightened relevance indicated. The top two search contexts in screen shot 82 are "shopping" vertical 815 and the Web indication 811.

Figure 8D:
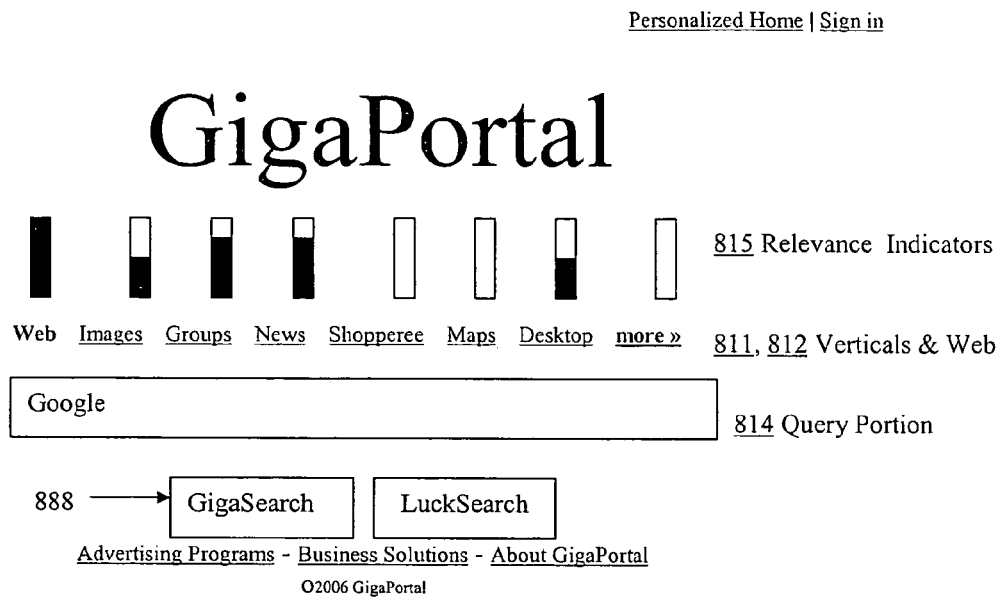

FIG. 8D depicts an example screen shot 83, which has a different format than that shown in screen shots 81 and 82. The functions are similar. In screen shot 83, an input denoting a complete query can be made by clicking the radio button 888.

Figure 8E:
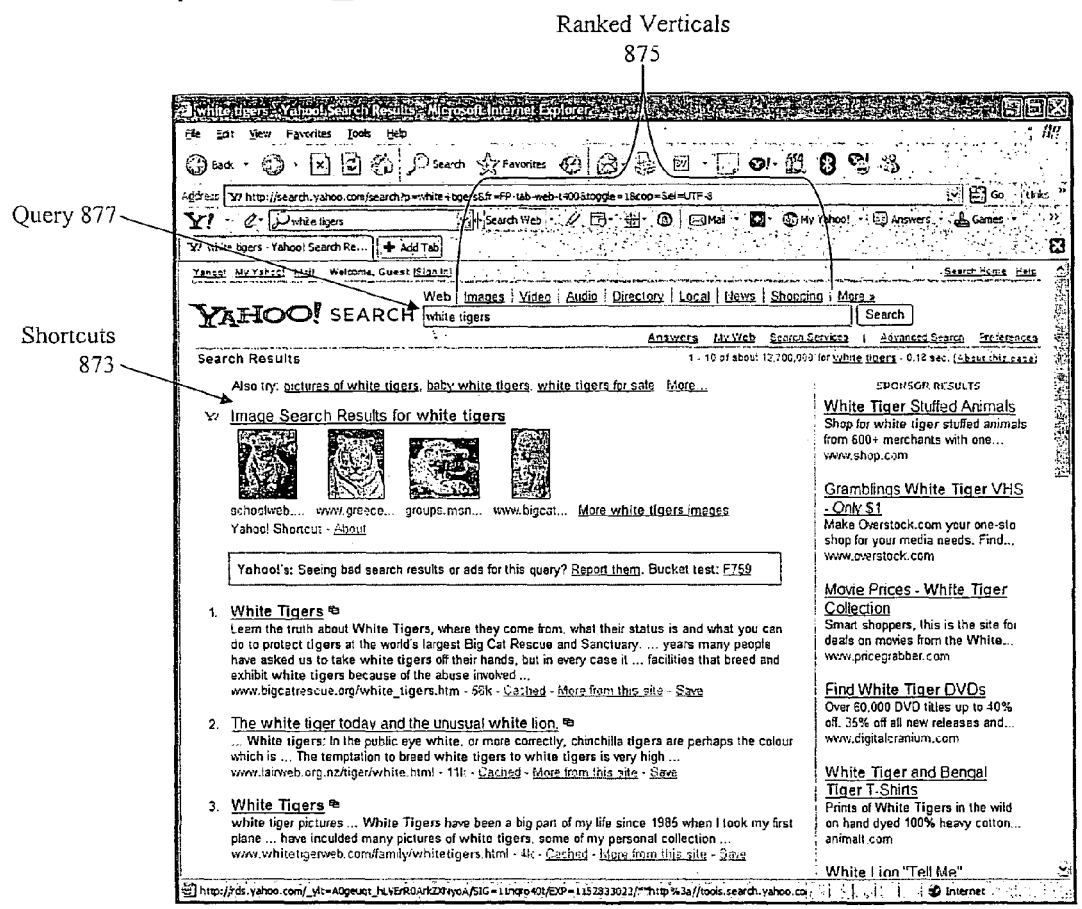

FIG. 8E depicts an example screen shot 85, which is somewhat similar in format to screen shots 81 and 82. Screen shot 85 however also illustrates multiple shortcuts 873. Shortcuts 893 comprise links (e.g., hyperlinks) to content locations that are associated with search contexts. Upon an input of query 877, Shortcuts 873 are suggested by a gossip server from the most relevant search context or contexts. As illustrated in screen shot, the vertical 875 corresponding to "Images" is ranked as the most relevant of the ranked verticals 875. Thus, shortcuts 873 display links to the most relevant query results suggested from the most relevant of the verticals 875. Query 877 comprises a complete query in which a user types (or otherwise inputs) the character string and activates an 'enter', 'return' or similar key or a radio button for entering a search-initiating input such as a 'search', 'go', 'find' or similarly functional button.

In one embodiment, verticals 875 are, upon a user input representative of a complete query, responsively arranged (e.g., rearranged) in an array in which their relevance is graphically represented by their position in the array, such as with the most relevant ranked verticals arranged in the uppermost position, followed by the next most relevant vertical and so forth, down to the least relevant vertical, arranged below the other verticals. Thus, the relevance rankings of verticals 875 can be graphically display while obviating other relevance ranking graphical indicators, which can have the benefit of economizing on screen space and/or clutter.

Extensions, Alternatives And Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing query data, comprising:
in response to each character of a plurality of characters being entered into a client, and without activation in said client of a button control whose activation causes a currently entered query comprising said plurality of characters to be submitted over a network to a search engine, receiving a separate query portion from said client over said network, thereby receiving a plurality of query portions;
wherein each query portion of said plurality of query portions is a portion of a same query;
for each received query portion of said plurality of query portions, determining, for each search context of a plurality of search contexts, a relevance score based on one or more suggested queries derived from said received query portion, thereby determining a separate plurality of relevance scores for each received query portion of the plurality of query portions;
wherein each search context of the plurality of search contexts is a different set of information that has been previously searched using the one or more suggested queries to obtain links relevant to the one or more suggested queries;
wherein the one or more suggested queries derived from said received query portion include at least one query that is not the same as the received query portion; and
in response to each character of said plurality of characters being entered into said client, and for each particular query portion of said plurality of query portions, providing to said client over said network an indication of multiple relevance scores that were determined for said particular query portion, each relevance score of said multiple relevance scores being associated with a different search context in the plurality of search contexts;
wherein the step of providing the indication of relevance scores is performed by one or more processors in a computer system.

2. The method as recited in claim 1 wherein the steps of determining a relevance score and providing an indication are performed prior to receiving input that indicates that said query portion represents a complete query, wherein the one or more suggested queries are complete queries that the user is predicted to enter based upon the query portion.

3. The method as recited in claim 1 further comprising:
associating shortcuts with search contexts;
selecting a set of shortcuts based, at least in part, on said relevance scores for said search contexts and the association between said shortcuts and said search contexts; and
sending said set of shortcuts to said client;
wherein said each of said shortcuts comprises a link for accessing a content location associated with said shortcut.

4. The method as recited in claim 1 further comprising:
ranking category-significant web portals according to said relevance scores; and
displaying each of said category-significant web portals with a different one of the relevance score rankings at said client.

5. The method as recited in claim 1 wherein said query portion comprises a random query portion, further comprising categorizing said random query portion into each of said search contexts further based on said relevance score.

6. The method as recited in claim 1 wherein said indication comprises a graphical representation of each said relevance score.

7. The method of claim 1, further comprising:
performing, at a search engine, a plurality of searches over a period of time in response to a plurality of search requests, each search request of the plurality of search requests comprising a query and search context selection information instructing the search engine to perform the query on a specific search context of the plurality of search contexts, the specific search context specifically selected for entering the query;
wherein each search context of the plurality of search contexts is a different set of searchable information for obtaining links relevant to the plurality of search requests;
based at least on the search context selection information included in the search requests for the period of time, logging the numbers of times the search engine is instructed to perform each query on each specific search context of a plurality of search contexts;
subsequent to the period of time, receiving from the client, over the network, a particular query portion of the plurality of query portions, said particular query being a complete query or portion thereof;
based on the logged numbers of times the search engine was instructed to perform each query on each specific search context, determining, for each specific search context of the plurality of search contexts:
(a) at least one of: the number of times the search engine was instructed to perform the particular query on the specific search context over the period of time, or the number of times the search engine was instructed to perform a suggested query derived from the particular query on the specific search context over the period of time; and (b) a particular relevance score of the particular query to the search context, the relevance score being calculated using at least one of: the number of times the search engine was instructed to perform the particular query on the specific search context over the period of time, or the number of times the search engine was instructed to perform a suggested query derived from the particular query on the specific search context over the period of time;

providing to said client over said network an indication of each said particular relevance Score.

8. The method as recited in claim 1 wherein determining each relevance score of each plurality of relevance scores comprises:

using a normalizing function based at least on : (1) a total number of queries that have been previously submitted in any of the plurality of search contexts over a period of time and (2) a total number of queries that have been previously submitted in a specific search context over the period of time.

9. The method as recited in claim 1, wherein determining each relevance score of each plurality of relevance scores comprises:

determining two or more suggested queries for a particular query portion, wherein at least one of the suggested queries is different from the particular query portion;

determining, for each specific search context of the plurality of search contexts, the number of times each of the two or more suggested queries was directed to the specific search context over the period of time;

wherein each relevance score is based at least on the numbers determined for each of the two or more suggested queries for a corresponding search context.

10. The method as recited in claim 1, further comprising determining a particular relevance score for a particular search context by at least performing one of: calculating a frequency of the number of times a particular query portion was directed to the particular search context over a period of time compared to the number of times the particular query portion was received in a plurality of search requests, or calculating a frequency of the number of times one or more suggested queries based on the particular query portion were directed to the particular search context over the period of time compared to the number of times the one or more suggested queries were received in a plurality of search requests.

11. One or more non-transitory storage media storing instructions which, when executed by one or more computing devices, cause performance of the method recited in claim 1.

12. The method of claim 1, wherein providing to said client an indication of relevance scores in the plurality of relevance scores comprises providing to said client a graphical representation of the plurality of relevance scores;

wherein the graphical representation comprises a plurality of bars, each bar being representative of a different relevance score in the plurality of relevance scores, the size of each bar being based on upon its represented relevance score;

wherein, in response to each character of the plurality of characters, the one or more computing devices provides a different graphical representation, wherein the sizes of one or more of the plurality of bars are different for each different graphical representation.

13. The method of claim 1, wherein the plurality of search contexts include a plurality of collections of information, each collection being tailored to a specific topic or a specific demographic group.

14. The method of claim 1, further comprising:

performing a plurality of searches over a period of time in response to a plurality of search requests, each search request of the plurality of search requests comprising a query directed to a specific search context, the specific search context specifically selected for entering the query;

wherein each search context is a different set of searchable information for obtaining links relevant to the plurality of search requests;

for the period of time, logging the number of times each query is directed to each specific search context of a plurality of search contexts;

wherein each determined relevance score is calculated based on the logging.

15. The method of claim 1, further comprising sending to the client code that causes the client to display a link to each of the different search contexts in the plurality of search contexts, and that further causes the client to rearrange the links as the multiple relevance scores change in response to each character of said plurality of characters.

16. The method of claim 1, further comprising:

in response to one or more characters of said plurality of characters being entered into said client, sending code to the client that causes the client to display one or more suggested queries;

sending to client code that causes the client to display, when the one or more suggested queries are selected, indications of multiple relevance scores that were determined for the one or more suggested queries.

17. One or more non-transitory storage media storing instructions which, when executed by one or more computing devices, cause performance of the method recited in claim 2.

18. One or more non-transitory storage media storing instructions which, when executed by one or more computing devices, cause performance of the method recited in claim 3.

19. One or more non-transitory storage media storing instructions which, when executed by one or more computing devices, cause performance of the method recited in claim 4.

20. One or more non-transitory storage media storing instructions which, when executed by one or more computing devices, cause performance of the method recited in claim 5.

21. One or more non-transitory storage media storing instructions which, when executed by one or more computing devices, cause performance of the method recited in claim 6.

22. One or more non-transitory storage media storing instructions which, when executed by one or more computing devices, cause performance of the method recited in claim 7.

23. The method of claim 7, wherein providing to said client an indication of each said relevance score comprises providing to said client a graphical representation of said relevance scores;

wherein the graphical representation comprises a plurality of bars, each bar being representative of a different score of said relevance scores, the size of each bar being based on upon its represented relevance score.

24. The method of claim 7, wherein the plurality of search contexts includes a web portal.

25. The method of claim 7, wherein the plurality of search contexts includes a search vertical.

26. The method of claim 7, wherein each query of each of the plurality of searches is entered in an interactive text field configured to accept a query directed to a specific search context and send, to the search engine, the search context selection information identifying the specific search context.

27. One or more non-transitory storage media storing instructions which, when executed by one or more computing devices, cause performance of the method recited in claim 8.

28. One or more non-transitory storage media storing instructions which, when executed by one or more computing devices, cause performance of the method recited in claim 9.

29. One or more non-transitory storage media storing instructions which, when executed by one or more computing devices, cause performance of the method recited in claim 10.

30. One or more non-transitory storage media storing instructions which, when executed by one or more computing devices, cause performance of the method recited in claim 12.

31. One or more non-transitory storage media storing instructions which, when executed by one or more computing devices, cause performance of the method recited in claim 13.

32. One or more non-transitory storage media storing instructions which, when executed by one or more computing devices, cause performance of the method recited in claim 14.

33. One or more non-transitory storage media storing instructions which, when executed by one or more computing devices, cause performance of the method recited in claim 15.

34. One or more non-transitory storage media storing instructions which, when executed by one or more computing devices, cause performance of the method recited in claim 16.

35. One or more non-transitory storage media storing instructions which, when executed by one or more computing devices, cause performance of the method recited in claim 23.

36. One or more non-transitory storage media storing instructions which, when executed by one or more computing devices, cause performance of the method recited in claim 24.

37. One or more non-transitory storage media storing instructions which, when executed by one or more computing devices, cause performance of the method recited in claim 25.

38. One or more non-transitory storage media storing instructions which, when executed by one or more computing devices, cause performance of the method recited in claim 26.

\* \* \* \* \*